United States Patent [19]

Akazawa et al.

[11] Patent Number: 5,896,441
[45] Date of Patent: *Apr. 20, 1999

[54] COMMUNICATION STATE MANAGEMENT SYSTEM AND METHOD IN AN INTELLIGENT NETWORK

[75] Inventors: Mitsunori Akazawa; Tetsuya Sakata; Satomi Kawakami, all of Kanagawa, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/768,574

[22] Filed: Dec. 16, 1996

[30] Foreign Application Priority Data

Jun. 19, 1996 [JP] Japan ............... 8-158035

[51] Int. Cl.[6] ............... H04M 1/24; H04M 3/08; H04M 3/22
[52] U.S. Cl. ............... 379/9; 379/1; 379/32; 379/134; 379/279
[58] Field of Search ............... 379/9, 10, 15, 379/34, 111, 112, 113, 219, 229, 230, 265, 1, 30, 133, 115, 134, 220, 221, 266, 309, 196–197, 189, 210–212, 269, 279

[56] References Cited

U.S. PATENT DOCUMENTS 5,197,096  3/1993  Sukuma et al. ............... 379/211
5,365,582  11/1994  Yamada et al. ............... 379/265
5,455,855  10/1995  Hokari ............... 379/198
5,465,294  11/1995  Chapman, Jr. et al. ............... 379/279
5,572,584  11/1996  Yabusaki et al. ............... 379/211
5,646,988  7/1997  Hikawa ............... 379/265

FOREIGN PATENT DOCUMENTS 6-46129    2/1994  Japan.
6-315047  11/1994  Japan.

*Primary Examiner*—Paul Loomis
*Assistant Examiner*—Binh K. Tieu
*Attorney, Agent, or Firm*—Helfgott & Karas, P.C.

[57] ABSTRACT

A subscriber A accommodated in an SSP is connected to a terminal to which a telephone number is assigned by a number conversion service. The communication state of the converted telephone number becomes in a busy state, and a corresponding SSP number is written in a management table arranged in an SCP. If a fault occurs in the SSP, all of the calls to which a subscriber accommodated in the SSP is connected, are released. Once the SSP is restored from the fault, it notifies the SCP of the SSP number identifying the SSP together with a message notifying that the SSP is restored from the fault. The SCP searches for a management table using the SSP number received from the SSP, and changes all of the communication states of converted telephone numbers corresponding to the corresponding SSP number to an idle state.

17 Claims, 19 Drawing Sheets

111

| IN TELEPHONE NUMBER | CONVERTED TELEPHONE NUMBER | STATE (idle/busy) |
|---|---|---|
| 0120-044-123 | 044-123-4567 | idle |
|  | 044-123-8901 | busy |
|  | 044-123-2345 | idle |
| 0120-045-321 | 045-321-4567 | busy |
|  | 045-321-8901 | busy |
|  | 045-321-2345 | idle |

| LINE IDENTIFICATION NUMBER | RECEIVER NUMBER | STATE |
|---|---|---|
| 001 |  |  |
| 002 | 044-123-4567 | busy |
| 003 |  |  |
| ⋮ | ⋮ | ⋮ |

SUBSCRIBER A → (row 002) ⇐ UPDATE

FIG. 2B

| IN TELEPHONE NUMBER | CONVERTED TELEPHONE NUMBER | STATE (idle/busy) | SSP NUMBER |
|---|---|---|---|
| 0120-044-123 | 044-123-4567 | idle | |
| | 044-123-8901 | busy | 150 |
| | 044-123-2345 | idle | |
| 0120-045-321 | 045-321-4567 | busy | 250 |
| | 045-321-8901 | busy | 150 |
| | 045-321-2345 | idle | |

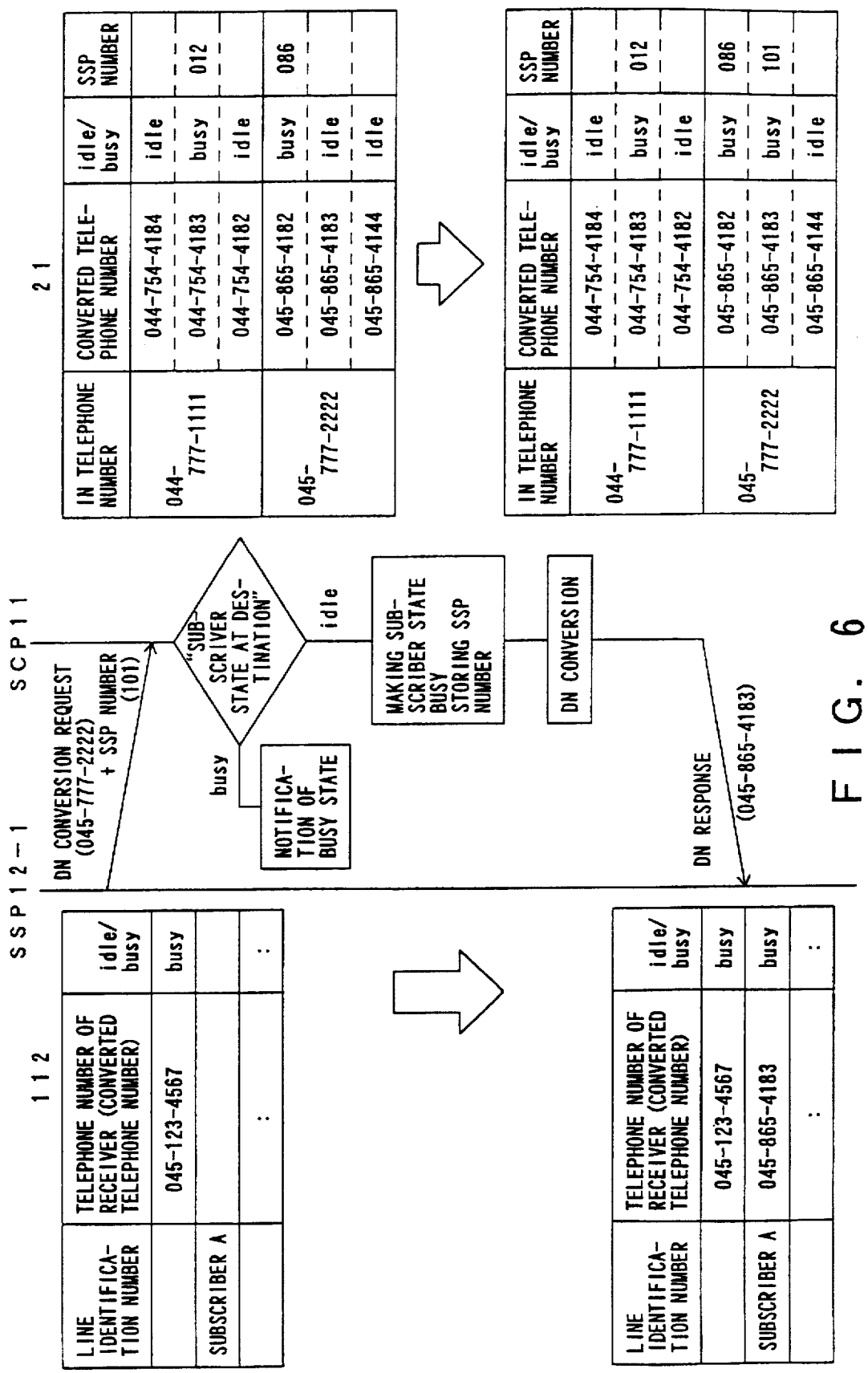
F I G. 6

COMMUNICATION STATE MANAGEMENT SYSTEM AND METHOD IN AN INTELLIGENT NETWORK

BACKGROUND OF THE INVENTION

1. Field of the Invention

The present invention relates to a system and a method for managing a state of a communication using an intelligent network, and more particularly to a system and a method for managing a state of a communication using an intelligent network which provides a service to convert a predetermined number which is preregistered into a number identifying a destination.

2. Description of the Related Art

An intelligent network is a communications network which has been popularized by meeting the demand for enhancing its capabilities, and an information transfer network and a service control network are arranged hierarchically.

The information transfer network is composed of electronic switches called SSPs (Service Switching Points), SAPs (Service Access Points), etc. Each of the SSPs is intended to transfer a service request from a subscriber to a service control network, and to control a communications network according to an instruction given by the service control network.

The service control network normally includes servers called SCPs (Service Control Points) or NSPs (Network Service Control Points). Each of the SCPs includes an integrated database which normally stores subscriber information, network configuration information, service control software, etc., and integrates communications service capabilities such as a communication processing capability, service providing capability, path selection control capability, etc. The SCP provides a service (required communication control information) in response to a request made by the SSP.

FIG. 1 is a schematic diagram showing the configuration of a typical intelligent network. An SCP 101 and SSPs 102-1 through 102-n are connected via a switching node for a common channel signaling network, called an STP (Signaling Transfer Point) 103. Each of the SSPs 102-1 through 102-n transmits a service request to the SCP 101 via the STP 103, while the SCP 101 provides a service (required communication control information) to each of the SSPs 102-1 through 102-n via the STP 103, in response to the service request.

The intelligent network provides enhanced services such as putting a number system into a virtual form (logical form), enhanced routing control, flexible interconnection control, variable operation of a communications network, etc.

One of the services provided by the intelligent network is a service for converting a telephone number, represented by a toll-free number telephone service. Provided below is the explanation about an example of the number conversion service. Here, a service for changing a destination depending on the availability of a subscriber at a destination such as an FRS (Flexible Routing Service), is raised.

The SCP 101 includes a management table (database) 111 shown in FIG. 2A in order to provide the number conversion service. In this figure, "IN telephone number" is a virtual number contracted in advance. "converted telephone number" is a telephone number of an actual and normal subscriber. If a subscriber inputs a certain IN telephone number, that call is connected to any of terminals having converted telephone numbers corresponding to the input IN telephone number. "state" indicates whether a terminal (line) identified by a converted telephone number is either busy or idle.

If a subscriber "A" accommodated in the SSP 102-1 inputs an IN telephone number 0120-044-123, the SSP 102-1 transmits the IN number to the SCP 101 to request convertion of the number. When receiving this request, the SCP 101 searches for a management table 111, retrieves a converted telephone number in the idle state (for example, 044-123-4567) from converted telephone numbers corresponding to that IN number, and returns the retrieved number to the SSP 102-1. At this time, the SCP 101 changes the state of the retrieved number to the "busy" state in the management table 111.

Each of the SSPs 102-1 through 102-n includes a management table 112 shown in FIG. 2B. "line identification number" is a number for identifying a line accommodated in each of the SSPs 102-1 through 102-n. "receiver number" is a telephone number of a receiver of a terminal connected to a line identified by the line identification number. "state" indicates whether or not the line identified by the line identification number, or a terminal connected to that line, is busy.

When receiving the converted telephone number from the SCP 101, the SSP 102-1 establishes a call according to that number. The SSP 102-1 updates data regarding the subscriber A in the management table 112. Assuming that the line identification number of the line to which the subscriber A is connected is 002, the SSP 102-1 writes the converted telephone number which is received as the receiver number in correspondence with the line identification number, and updates its state to "busy".

If the subscriber A releases the call, the SSP 102-1 clears the receiver number in the management table 112, and updates its state to "idle". In the meantime, the SCP 101 updates the state of the converted telephone number 044-123-4567 to "idle" in the management table 111, when receiving the notification that the call was released from the SSP 102-1.

As described above, the number conversion service such as an FRS is provided by arranging the management table 111 which manages an idle/busy state of a subscriber at a destination in the SCP 101.

The link between the SCP 101 and each of the SSPs 102-1 through 102-n, however, is not established all the time. It is established depending on need (for example, at an access made by a service request). Therefore, if a fault occurs in the SCP 101 or any of the SSPs 102-1 through 102-n, the contents of the management table 111 arranged in the SCP 101 may sometimes be inconsistent with an actual communication state of any of the SSPs 102-1 through 102-n, at the time of restoration from the fault.

Such an inconsistent state causes the following problem. By way of example, assume that the state of the telephone number 044-123-4567 is "busy" in the management table 111 arranged in the SCP 101, although a call between the subscriber A and the terminal having the telephone number 044-123-4567 (hereinafter referred to as a subscriber B), is released. Physically, the subscriber B can receive a call in this case. However, if a certain subscriber inputs the IN telephone number 0120-044-123, the SCP 101 regards the telephone number 044-123-4567 as being busy. Accordingly, the IN number 0120-044-123 is not converted into the telephone number 044-123-4567 in the number conversion service. That is, that line cannot be used even though the line of the subscriber B is actually available. As a result, the communication resource is not used properly.

The above described problem is due to an inconsistency between the contents of the management table 111 arranged in the SCP 101 and the actual communication state.

As a technique for monitoring the normality of the service between the SCP 101 and the SSPs 102-1 through 102-n, the invention "TOKKAIHEI 6-46129, for example, is known. This invention discloses a monitoring system for monitoring an entire network including an SCP and SSPs, and restarting the SCP or SSPs if a fault is detected. According to such a system for restarting the SCP or the SSPs, however, the service is forced to be halted. Specifically, if the SCP is restarted, it causes an undesirable phenomenon. That is, all of services are halted. Furthermore, a simple restart of the SCP or the SSPs cannot make the communication states that the SCP manages consistent with the actual communication states of the SSPs.

SUMMARY OF THE INVENTION

The object of the present invention is to provide an intelligent network which allows an effective use of communication resources by ensuring the consistency between communication states that an SCP manages and actual communication states of SSPs.

A communication state management system according to the present invention is intended to manage a state of a communication using an intelligent network which provides a service to convert a predetermined number which is preregistered into a number identifying a destination. It includes an SCP and a plurality of SSPs.

Each of the plurality of SSPs notifies the SCP of information identifying the SSP, when requesting the SCP to provide a service. Upon receipt of both the predetermined number which is preregistered and the information identifying the SSP which outputs the predetermined number from at least one of the plurality of SSPs, the SCP makes a correspondence between a number identifying a destination obtained from the received number, the communication state of the destination, and the received information identifying the SSP, stores them in a communication management table, and controls the communication state using that table.

Additionally, the SCP uses the information identifying the SSP stored in the communication state management table in order to make the communication states of the plurality of SSPs consistent with the communication states stored in the communication state management table. Whether the destination is either busy or idle is set in the communication state management table as the communication state of the destination. If one of the plurality of SSPs is restored from a halt (fault) state, the SCP updates the communication state of the destination in correspondence with the information identifying the restored SSP in the communication state management table to the "idle" state.

BRIEF DESCRIPTION OF THE DRAWINGS

FIG. 2A shows an example of a management table arranged in a conventional SCP;

FIG. 2B shows an example of a management table arranged in a conventional SSP;

FIG. 5 shows an example of a management table arranged in an SCP according to the embodiment of the present invention;

FIG. 6 is a flowchart showing a process when an SSP requests the SCP to provide a number conversion service;

DETAILED DESCRIPTION OF THE INVENTION

Figure 3:
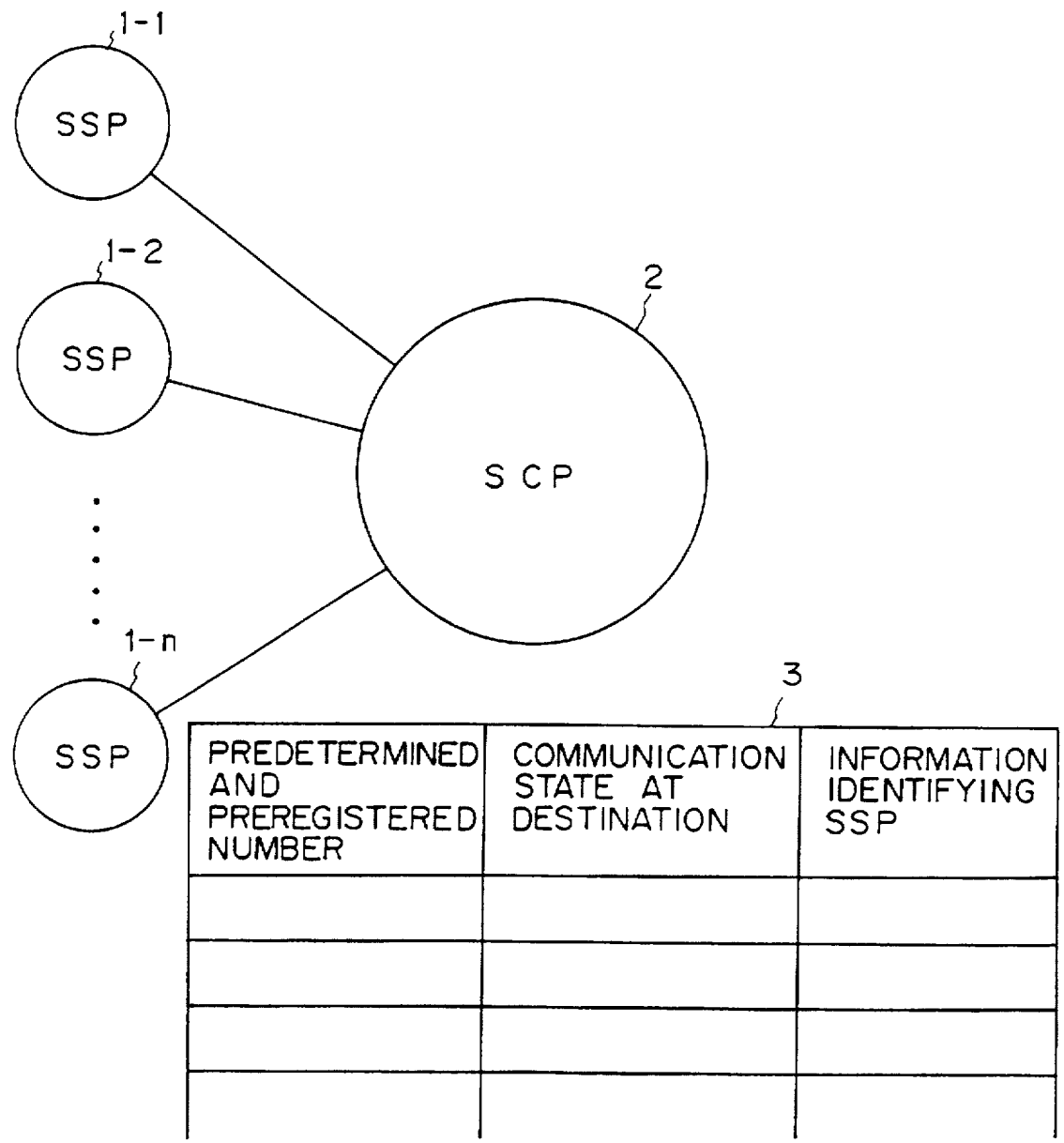
FIG. 3 is a schematic diagram showing the basic configuration of the present invention.

The principle of the present invention is explained hereinafter by referring to FIG. 3. Provided below is the explanation about a system for managing a state of a communication using an intelligent network which provides a service converting a predetermined number which is preregistered into a number identifying a destination.

Each of SSPs 1-1 through 1-n is, for example, an electronic switch, and is intended to request an SCP 2 to provide a service depending on need and to control a network according to communication control information provided by the SCP 2.

The SCP 2 is, for example, a server including a database. When receiving both a predetermined number and information identifying the SSP which outputs the predetermined number from one of the SSPs 1-1 through 1-n, the SCP 2 makes a correspondence between a number identifying a destination obtained from the received number, the communication state of the destination, and the received information identifying the SSP, and stores them in a communication state management table 3. Whether the destination is either busy or idle, for example, is set as the communication state of the destination stored in the communication state management table 3. The SCP 2 uses the communication state management table 3 to control the communication state, and at the same time uses the information identifying the SSP stored in the communication state management table 3 to make the communication states of the SSPs 1-1 through 1-n consistent with the communication states stored in the communication state management table 3.

As described above, the SCP 2 corresponds the information identifying the SSP which outputs the request, with the communication control information about the above described service, and stores them, when the SCP 2 provides a service in response to the request from any of the SSPs 1-1 through 1-n. Accordingly, the consistency between the communication states that the SCP 2 manages and the actual communication states of the SSPs 1-1 through 1-n can be maintained. Since this process for maintaining consistency is implemented by simply rewriting the communication state management table 2, it can be performed in real time without affecting any other communications.

If one of the SSPs 1-1 through 1-n is restored from a halt (fault) in the above described configuration, the SCP2 updates the communication state of a destination in correspondence with the information identifying the restored SSP, to the "idle" state in the communication state management table 3. Because a subscriber accommodated in the SSP restored from the halt is in the idle state due to a release of all connections, the consistency between the communication state management table 3 and the communication state of the SSP can be maintained by updating the communication state of the destination in correspondence with the information identifying the SSP restored from the halt to the idle state.

An embodiment according to the present invention is explained hereinafter. Here, a number conversion service is presented as one of the services provided by an intelligent network. With this number conversion service, one or more telephone numbers of normal subscribers are assigned to one preregistered IN telephone number. If a certain subscriber inputs the IN telephone number, that number is converted into any number in the idle state among the one or more assigned telephone numbers of the normal subscribers. As a result, the subscriber is connected to a terminal having the converted number. This service may sometimes be called an FRS (Flexible Routing Service).

Such a service is used for accepting a telephone order for catalogue shopping, for example. One or more telephones are arranged for a single IN number in this case. Each of the telephones possesses a telephone number of a normal subscriber. If a person who wants to place an order (a user) inputs the IN number, he or she is connected to one of the telephones in the idle state, which is registered for the IN number.

Figure 1:
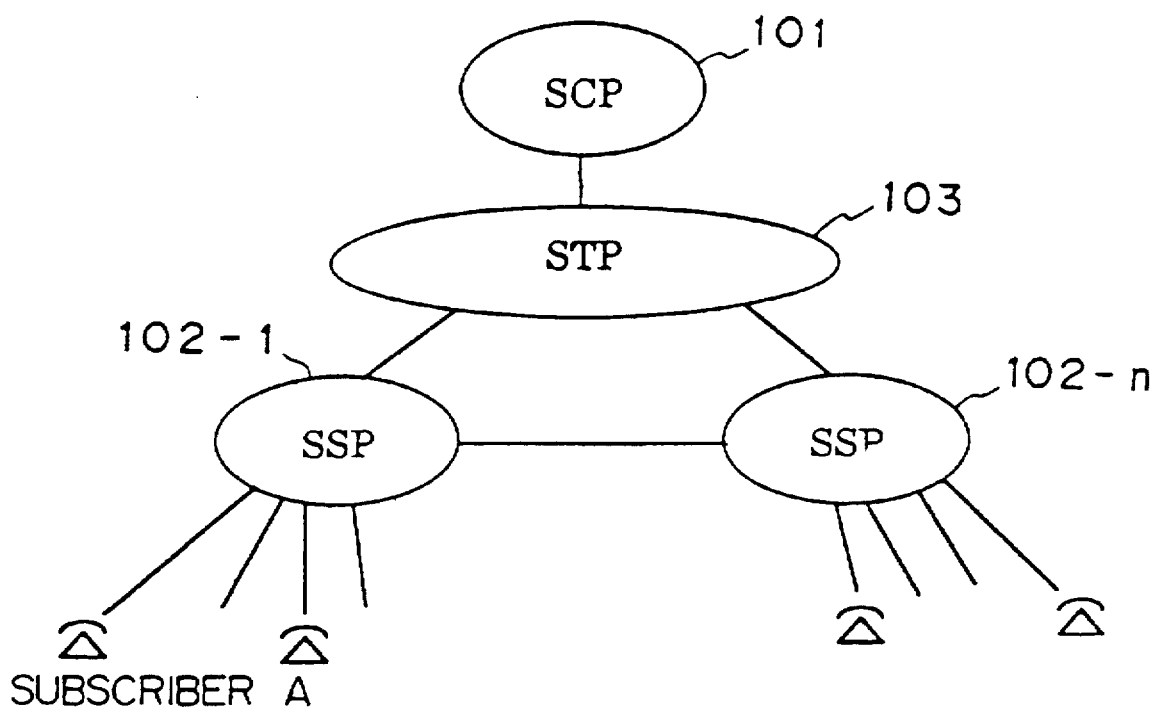
FIG. 1 is a schematic diagram showing the configuration of a typical intelligent network.
Figure 4:
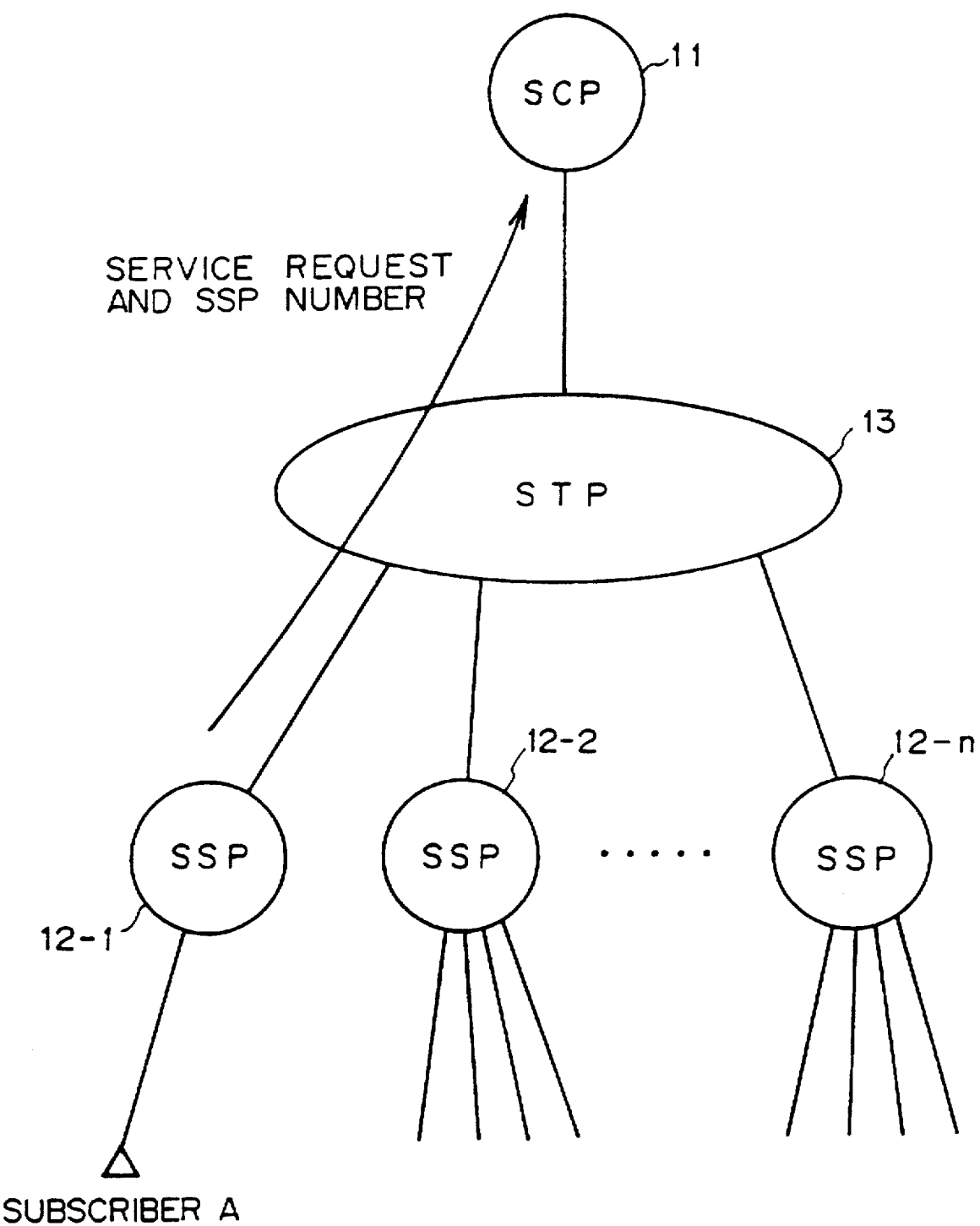
FIG. 4 is a schematic diagram showing the configuration of an intelligent network according to an embodiment of the present invention.

FIG. 4 is a schematic diagram showing the configuration of an intelligent network according to this embodiment. An SCP 11, SSPs 12-1 through 12-n, and an STP 13 basically have the same functions as those of the SCP 101, SSPs 102-1 through 102-n, and STP 103 shown in FIG. 1. Note that, however, each of the SSPs 12-1 through 12-n transfers an SSP terminal number as information identifying a corresponding SSP, when requesting the SCP 11 to provide a service. Additionally, the SCP 11 corresponds the terminal number of the SSP which outputs the service request, with a telephone number of a destination connected by that request, and manages them. With such a configuration, the SCP 11 can simply manage the communication state of one or more subscribers accommodated in each of the SSPs 12-1 through 12-n.

FIG. 5 exemplifies a structure of a communication state management table arranged in the SCP 11. A management table 21 includes SSP terminal numbers as information identifying an SSP which outputs a service request in addition to the information included in the management table 111 shown in FIG. 2A. The SSP terminal number is set for a converted telephone number (a telephone number of a destination connected by the service request from the SSP).

Three telephone numbers of normal subscribers are registered as converted telephone numbers for respective IN telephone numbers 0120-044-123 and 0120-045-321 in the example shown in FIG. 5. The communication states of 044-123-8901, 045-321-4567, and 045-321-8901 among all of the telephone numbers are put into the busy state by the number conversion service. Additionally, "150" written as the SSP terminal number in correspondence with the number 044-123-8901 indicates that a subscriber accommodated in an SSP whose terminal number is 150 is connected to a terminal having the telephone number 044-123-8901, according to a number conversion request made by that subscriber.

FIG. 6 is a flowchart showing a process performed when an SSP requests an SCP to provide a number conversion service. Provided here is the explanation about the case in which the subscriber A accommodated in the SSP 12-1 shown in FIG. 4 inputs an IN telephone number.

When the subscriber A inputs the IN telephone number 045-777-2222, the SSP 12-1 identifies the number received from the subscriber A is an IN telephone number, transfers that IN telephone number to the SCP 11, and requests the SCP 11 to convert the number. Here, the transfer of the IN telephone number to the SCP 11 is called a DN conversion request. The SSP 12-1 notifies the SCP 11 of its own SSP number as the information identifying the SSP 12-1 itself, when making the DN conversion request. The number of the SSP 12-1 is "101".

When receiving the IN telephone number 045-777-2222, the SCP 11 searches for a management table 21 to check to see if any of converted telephone numbers registered for that IN telephone number is in the idle state. Here, the number 045-865-4183 is retrieved as a converted telephone number in the idle state. Furthermore, the SCP 11 updates the communication state of the retrieved number to the "busy" state, and writes the SSP number "101" notified from the SSP 12-1 in correspondence with the converted telephone number. Then, the SCP 11 transfers the converted telephone number which is retrieved from the management table 21 to the SSP 12-1.

The SSP 12-1 updates the state of the line to which the subscriber A is connected to the "busy" state in the management table 112 (the same as shown in FIG. 2B), and writes the converted telephone number that the SCP 11 transfers as a telephone number of a receiver (destination telephone number). After that, the SSP 12-1 connects the subscriber A to the terminal to which the number 045-865-4183 is assigned, in a similar manner as in a normal call connection process.

If all of the converted telephone numbers registered for the IN telephone number that the SCP 11 receives are busy, the SCP 11 notifies the SSP 12-1 of that fact. The SSP 12-1 then notifies the subscriber A that the connection to the IN telephone number 045-777-2222 cannot be made.

Figure 7:
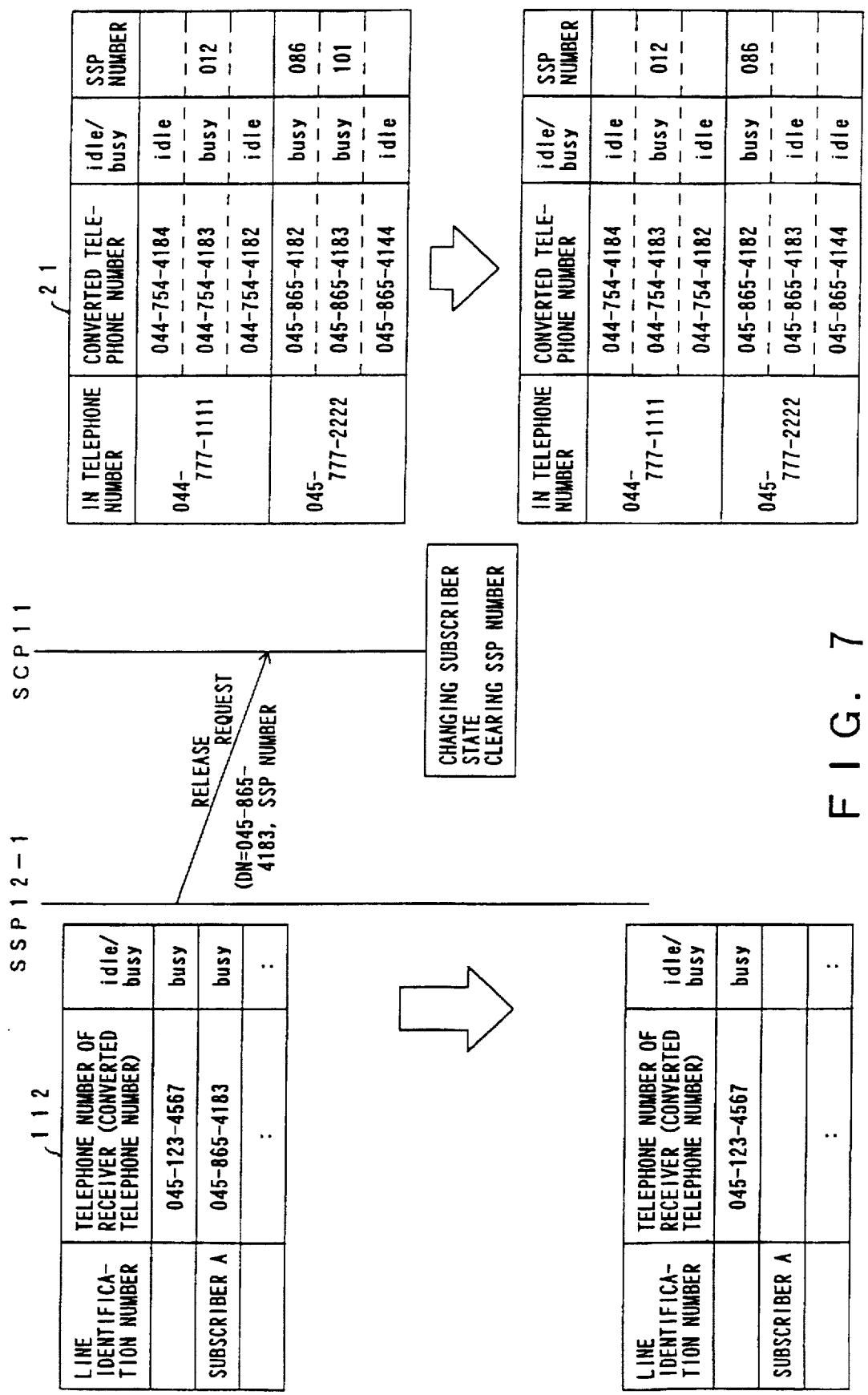
FIG. 7 is a flowchart showing a process performed when a call is released.

FIG. 7 is a flowchart showing a process performed when a call is released. Provided here is the explanation about the case in which the subscriber A releases the call following the connection state shown in FIG. 6. When the subscriber A (or the receiver of the subscriber A) releases the call, the SSP 12-1 updates the state of the line to which the subscriber A is connected, to the "idle" state in the management table 112, and erases the telephone number of the receiver. Furthermore, the SSP 12-1 notifies the SCP 11 that the number 045-865-4183 was released. The SSP 12-1 also transfers the number of the SSP 12-1 to the SCP 11 at the time of this notification.

When receiving the notification, the SCP 11 updates the communication state of the converted telephone number 045-865-4183 to the "idle" state, and clears the SSP number, in the management table 21. After that, the terminal to which the telephone number 045-865-4183 is assigned will be a state in which a next call can be accepted.

Figure 8:
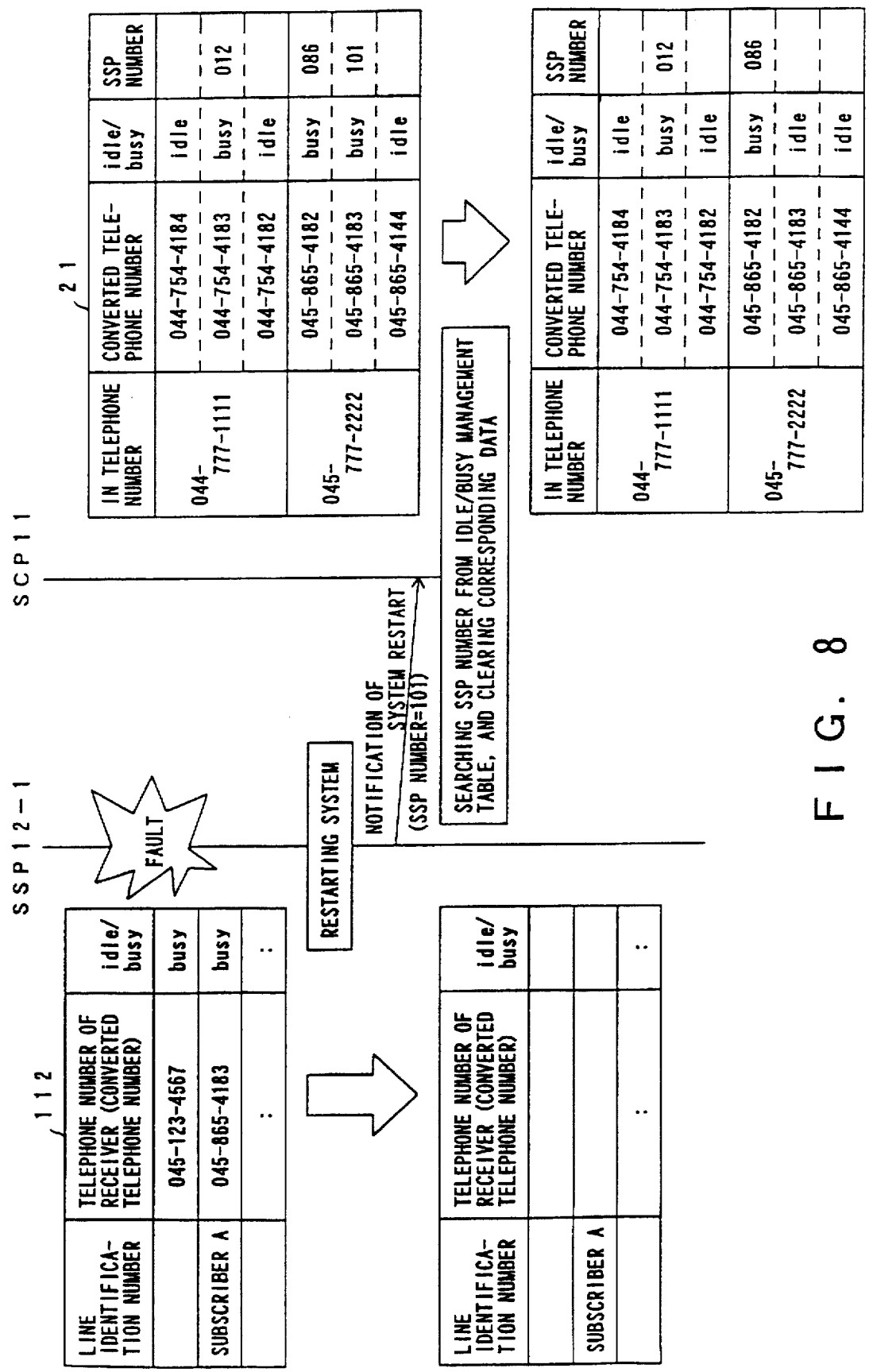
FIG. 8 is a flowchart showing a process performed when the SSP is restored from a fault.

FIG. 8 is a flowchart showing a process performed when an SSP is restored from a fault. Provided here is the explanation about the case in which the fault occurs in the SSP 12-1, which accommodates the subscriber A, while the subscriber A is connected to a terminal to which the telephone number 045-865-4183 is assigned by the number conversion service.

While the subscriber A is connected to the terminal to which the telephone number 045-865-4183 is assigned, that number is written as a telephone number of a receiver for the line to which the subscriber A is connected in the management table 112 arranged in the SSP 12-1. In the meantime, the communication state of the converted telephone number 045-865-4183 is "busy", and "101" is written as the SSP number, in the management table 21 arranged in the SCP 11.

If the SSP 12-1 is halted in this state, all calls using the line accommodated in the SSP 12-1 are released. As a result, the terminal to which the telephone number 045-865-4183 is assigned, that is, the telephone number of the receiver of the subscriber A, becomes idle. After that, the terminal to which the telephone number 045-865-4183 is assigned will be in a state in which a next call can be accepted. Additionally, when the SSP 12-1 is restored from the halt, the management table 112 is cleared. That is, the data regarding the "telephone number of the receiver" and the "communication state" are deleted from the management table 112.

The SSP 12-1 transfers a message for notifying that the service is resumed to the SCP 11 (and other SSPs) after being restored from the halt. This message includes the SSP number (=101) as the information identifying the SSP 12-1.

Upon receipt of this message, the SCP 11 searches for the management table 21 using the SSP number included in the message, updates the communication states of all the converted telephone numbers for which the SSP number (=101) is set, to the "idle" state, and deletes that SSP number from wherever it appears in the table 21.

As described above, even if a call of a subscriber accommodated in the SSP 12-1 is released due to a fault, etc., the consistency between the contents of the management table 21 and actual communication states can be maintained by releasing a converted telephone number for which the SSP number 101 is set in the management table 21 arranged in the SCP 11. The converted telephone number released with this procedure will become available for the next number conversion service. For example, if a certain subscriber inputs the IN telephone number 045-777-2222, the terminal to which the telephone number 045-865-4183 is assigned can be specified as a receiver to be connected to the subscriber.

Figure 9:
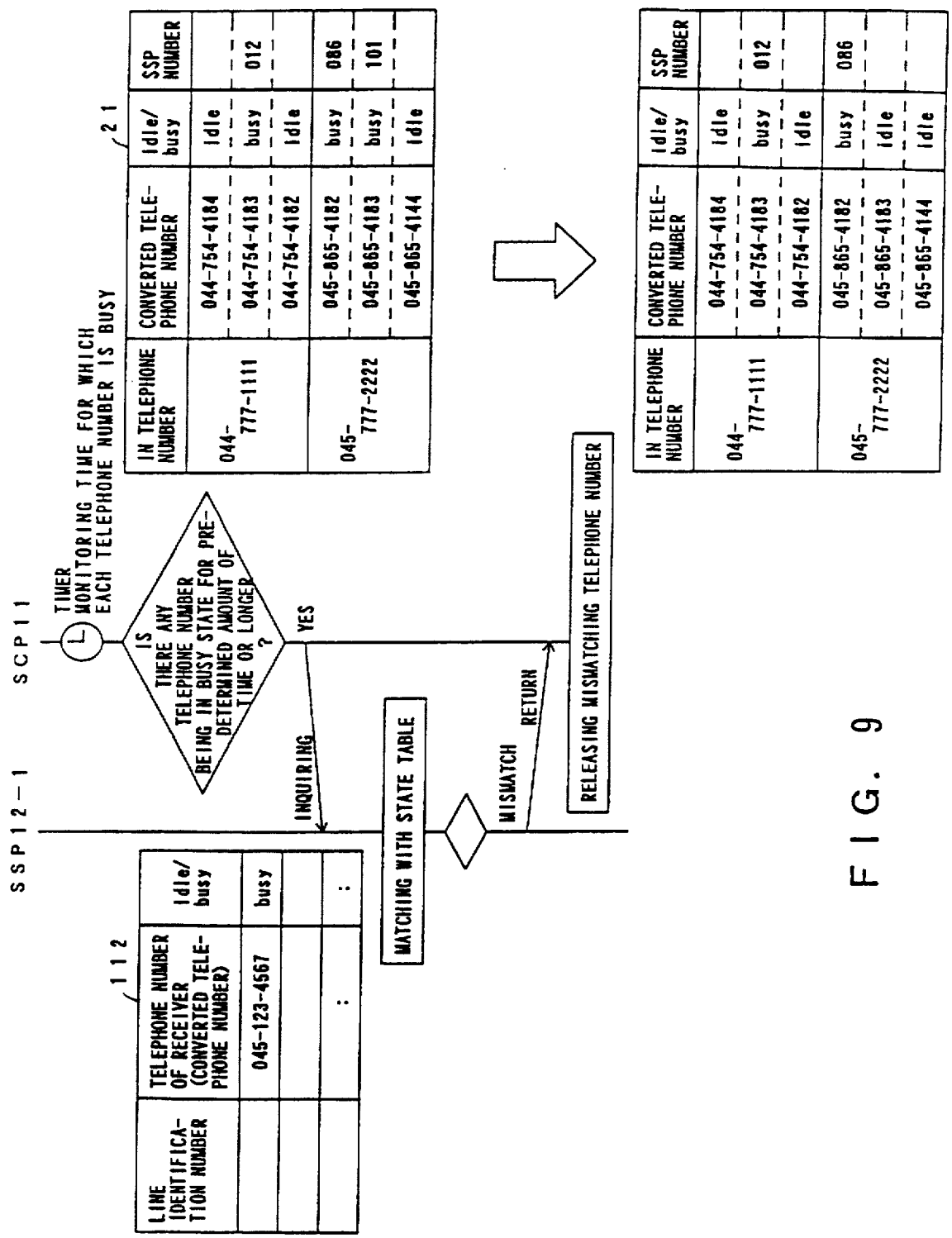
FIG. 9 is a flowchart showing a process for verifying a communication state of a telephone number which is in the busy state for a predetermined amount of time or more.

FIG. 9 is a flowchart showing a process for verifying a communication state of a telephone number which remains busy for a predetermined amount of time or longer.

The SCP 11 checks to see if there is any converted telephone number in the busy state for a predetermined amount of time or longer, using a timer. For example, a counter is arranged for each of the converted telephone numbers and incremented at predetermined time intervals after the communication state becomes busy, so that the SCP 11 detects that the count value exceeds a threshold value.

If there is a converted telephone number in the busy state for a predetermined amount of time or longer, the SCP 11 retrieves the SSP number set for the converted telephone number, by referencing the management table 21. Here, assume that the converted telephone number 045-865-4183 is in the busy state for the predetermined amount of time or longer. Accordingly, the SCP 11 retrieves "101" as the SSP number. The SCP 11 inquires an SSP whose number is 101, that is, the SSP 12-1, if the call whose receiver is the telephone number 045-865-4183 is actually established.

The SSP 12-1 references the management table 112 to check to see if the number 045-865-4183 is established as the telephone number of the receiver. If the telephone number 045-865-4183 is set as the telephone number of the receiver in the management table 112, the SSP 12-1 determines that the communication state managed by the SCP 11 matches the actual communication state. If the number 045-865-4183 is not set as the telephone number of the receiver in the management table 112, the SSP 12-1 determines that the communication state managed by the SCP 11 does not match the actual communication state. The SSP 12-1 then notifies the SCP 11 of the determination result. If the result of the inquiry made by the SSP 12-1 indicates a mismatch, the SCP 11 changes the communication state of the telephone number 045-865-4183 to the idle state in the management table 21, in order to match the contents of the management table 21 with the actual communication state.

Note that if there is a converted telephone number in the busy state for a predetermined amount of time on the condition that the SCP 11 recognizes an SSP accommodating a converted telephone number, the SCP 11 may inquire the SSP accommodating the converted telephone number about its actual communication state.

The mismatch state can be released according to the above described process, when a call is in a state as if it were established due to a certain reason in the management table 21 in the SCP 11, although it is actually released.

Figure 10:
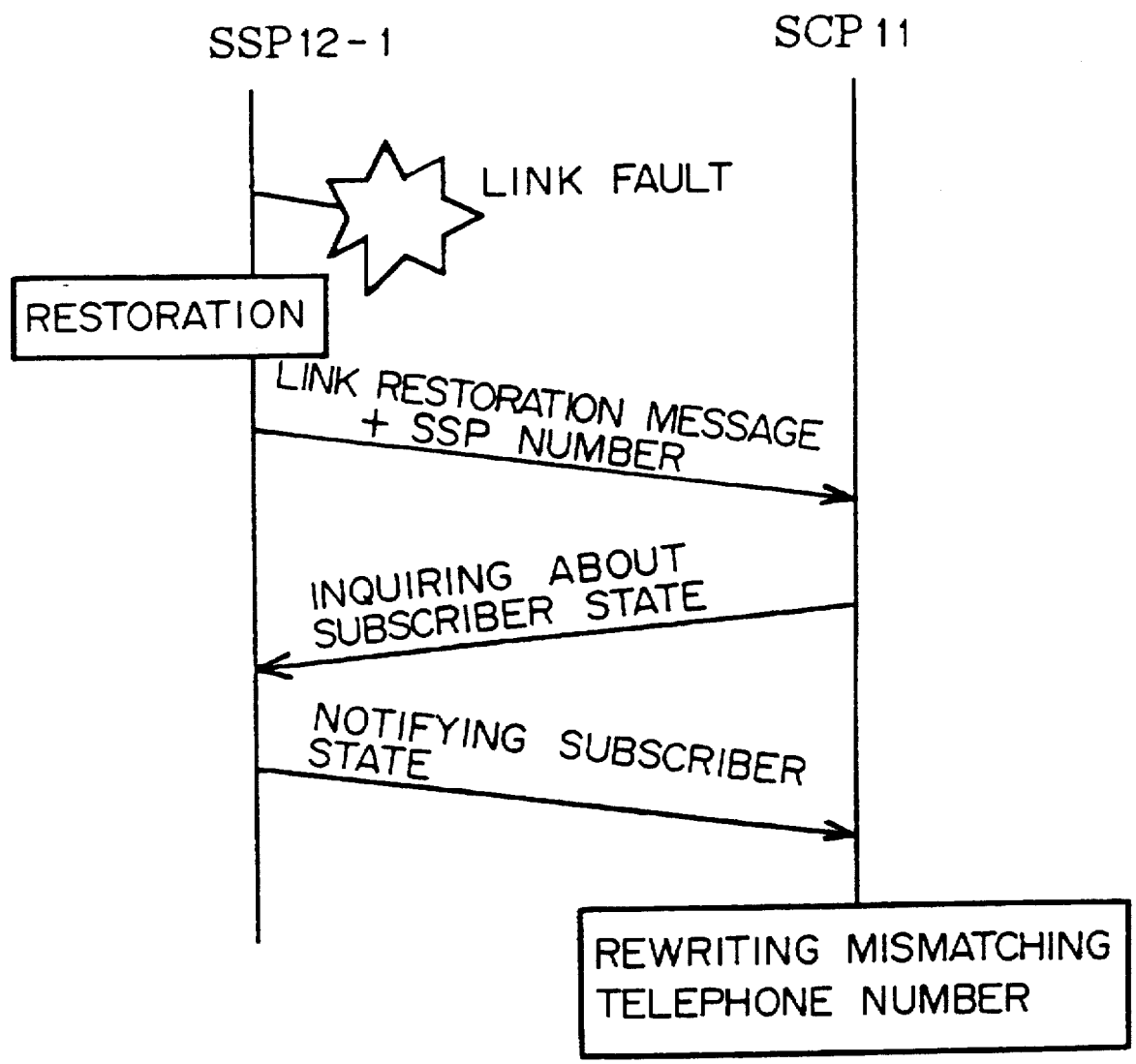
FIG. 10 is a flowchart 1 showing a process performed when a fault occurs in a link between the SCP and the SSP.
Figure 11:
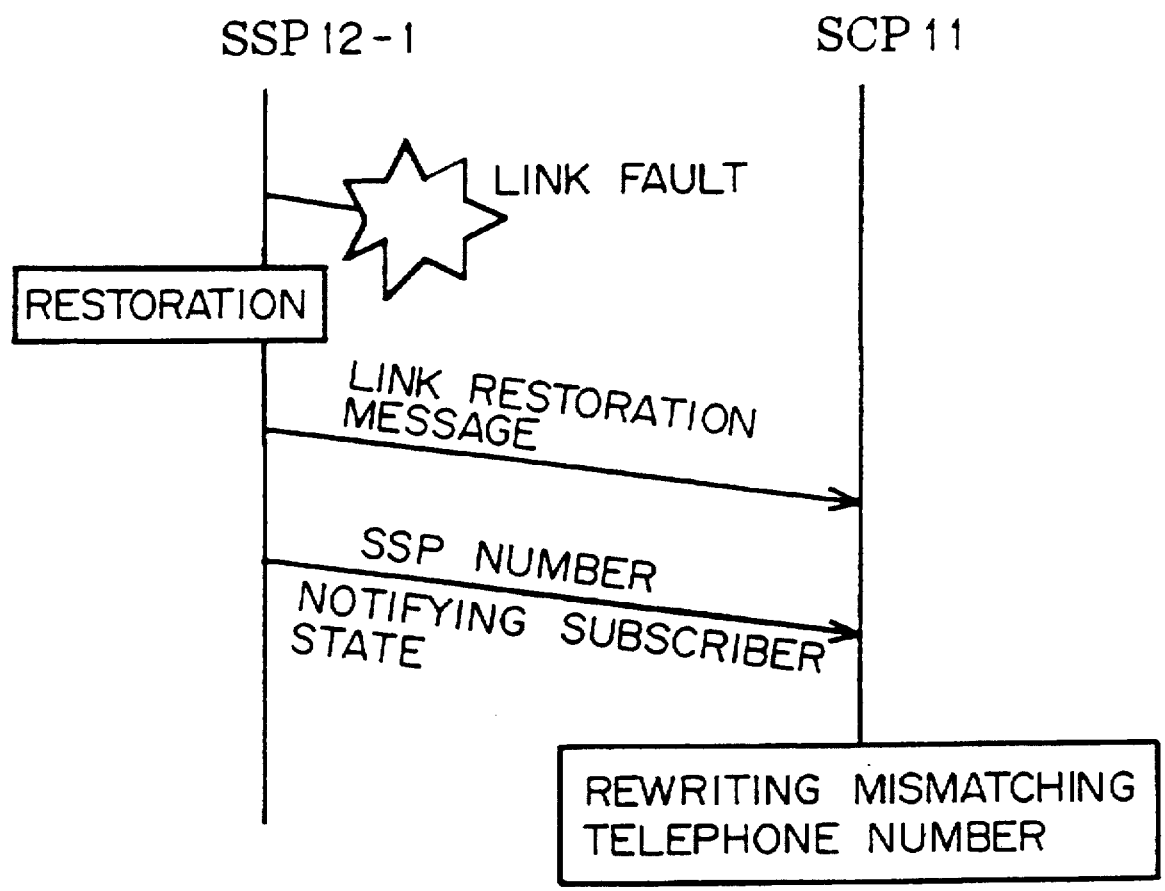
FIG. 11 is a flowchart 2 showing a process performed when the fault occurs in the link between the SCP and the SSP.

FIGS. 10 and 11 are flowcharts showing processes performed when a fault occurs in a link between an SCP and an SSP. If the fault occurs in the link between the SCP and the SSP, information cannot be exchanged between them. Accordingly, the problem that the communication state of the subscriber accommodated in the SSP and that managed by the SCP does not match, can occur. Provided below is the procedure for maintaining the consistency between the communication state of the SCP and that of the SSP in the case in which such a link fault occurs.

If a fault occurs in the link between the SCP and the SSP, the SSP recognizes the link fault due to the fact that no answer can be received from the SCP even though the SSP requests the SCP to provide a service. Once the SSP recognizes the link fault, it newly establishes a link between the SCP and itself to notify the SCP of both a message conveying that the link fault occurred and has now been fixed, and the SSP number identifying that SSP.

After that, the SCP inquires the SSP identified by the received SSP number about the communication state of the subscriber accommodated in that SSP, according to the procedure shown in FIG. 10. Specifically, the SCP inquires the SSP about the communication state according to a procedure similar to that explained by referring to FIG. 9. For example, if a fault occurs in a link between the SSP 12-1 and the SCP 11, the SCP 11 searches for the management table 21, and retrieves all of converted telephone numbers whose SSP numbers are 101, upon receipt of both the message conveying that the link fault occurred and has now been fixed, and the SSP number (=101). The SCP 11 inquires the SSP 12-1 if the retrieved numbers are set as the telephone numbers of receivers in the management table 112 in the SSP 12-1. If there is a converted telephone number not to be set, the SCP 11 updates the communication state of that number to the "idle" state in the management table 21.

With the procedure shown in FIG. 11, the inquiry about the subscriber state is made not from the SCP to the SSP, but the SSP notifies the SCP of the link fault. That is, if the SSP 12-1 is taken as an example in a similar manner as shown in FIG. 10, the SSP 12-1 retrieves a telephone number of a receiver connected by the number conversion service among the telephone numbers of the receivers of the subscriber accommodated in the SSP 12-1. The retrieved number is notified to the SCP 11 together with the SSP number (=101) of the SSP 12-1.

The SCP 11 rewrites the management table 21 in order to be consistent with the information about the communication state notified by the SSP 12-1. Specifically, the SCP 11 retrieves records whose SSP numbers are 101, and changes the communication state of a converted telephone number which matches the number transferred from the SSP 12-1 among them to the busy state, and changes the communication states of the converted telephone numbers which do not match the transferred number to the idle state.

Figure 12:
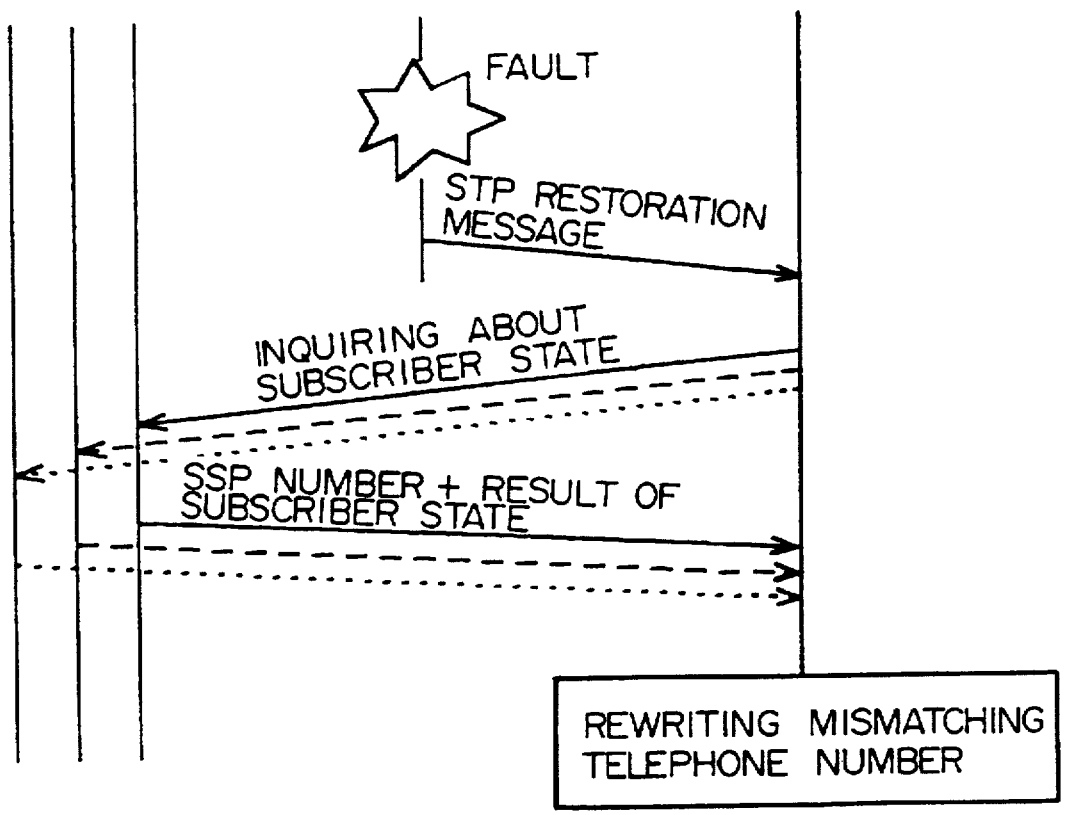
FIG. 12 is a flowchart 1 showing a process performed when a fault occurs in an STP arranged in a network interconnecting the SCP and the SSP.
Figure 13:
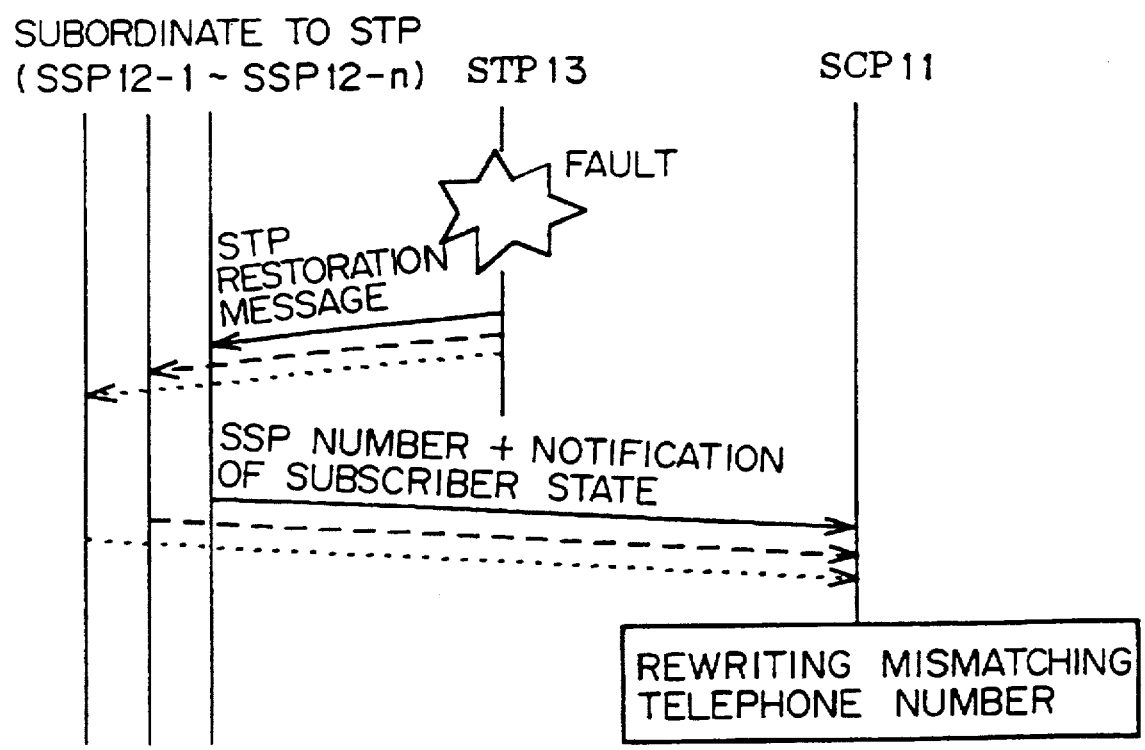
FIG. 13 is a flowchart 2 showing a process performed when the fault occurs in the STP arranged in the network interconnecting the SCP and the SSP.

FIGS. 12 and 13 are flowcharts showing processes performed when a fault occurs in an STP (Signalling Transfer Point) arranged in a network which interconnects an SCP and SSPs. The STP is a switching node for a common channel signaling system interconnecting the SCP and each of the SSPs. If a fault occurs in the STP, information cannot be exchanged between each of the SSPs and the SCP, which are subordinate to that STP. Therefore, there is a possibility that the communication state of a subscriber accommodated in each of the SSPs does not match that managed by the SCP. Provided below is the explanation about the procedure for maintaining the consistency between the communication state of the SCP and that of each of the SSPs, when an STP fault occurs.

In FIG. 12, when the STP 13 is restored from a fault, the STP 13 transfers a message that the STP is restored to the SCP 11. The SCP 11 sequentially inquires all of the SSPs whose numbers are included in the management table 21 about their communication states, upon receipt of the message that the STP is restored. Then, the SCP 11 rewrites the management table 21 to be consistent with the result of the inquiry. This procedure is the same as that shown in FIG. 10. Since there is no need to inquire an SSP which does not request the SCP 11 to provide a service about its communication state with such a procedure, the process for maintaining consistency can be implemented in a short time.

In FIG. 13, when the STP 13 is restored from a fault, it transfers the message that the STP is restored to each of the SSPs 12-1 through 12-n. Each of the SSPs 12-1 through 12-n notifies the SCP 11 of its communication state and SSP number according to a procedure similar to that explained by referring to FIG. 11. The SCP 11 then rewrites the management table 21 to be consistent with the notified communication state and SSP number.

Figure 14:
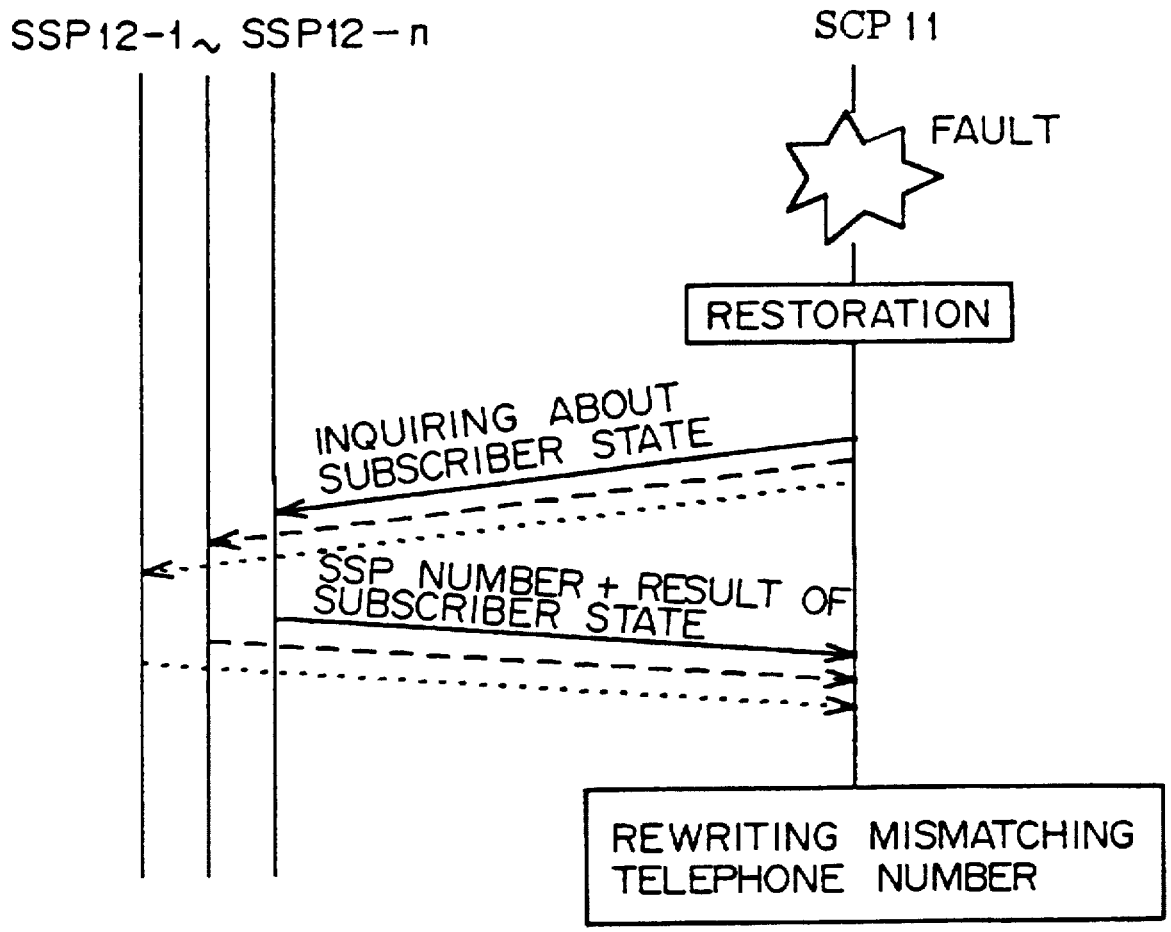
FIG. 14 is a flowchart showing a process performed when a fault occurs in the SCP.

FIG. 14 is a flowchart explaining a process performed when a fault occurs in an SCP. If a fault occurs in the SCP, a management table managing a communication state in the SCP is cleared. Accordingly, the management table must be rewritten by inquiring each of the SSPs about its communication state, when the SCP is restored from the fault. In the meantime, in the configuration in which the management table is stored in a non-volatile storage device in the SCP, the data included in the management table is kept even if a fault occurs in the SCP. The communication state of each of the SSPs, however, may vary while the SCP is halted. Accordingly, the management table must also be updated by inquiring each of the SSPs about its communication state also in this case.

The procedure with which the SCP 11 inquires each of the SSPs 12-1 through 12-n about its communication state, and rewrites the contents of the management table 21 in the SCP 11 to be consistent with the result of the inquiry, is the same as that shown in FIG. 12. However, it is desirable to ask all of the SSPs 12-1 through 12-n about their communication states when a fault occurs in the SCP 11.

Figure 15:
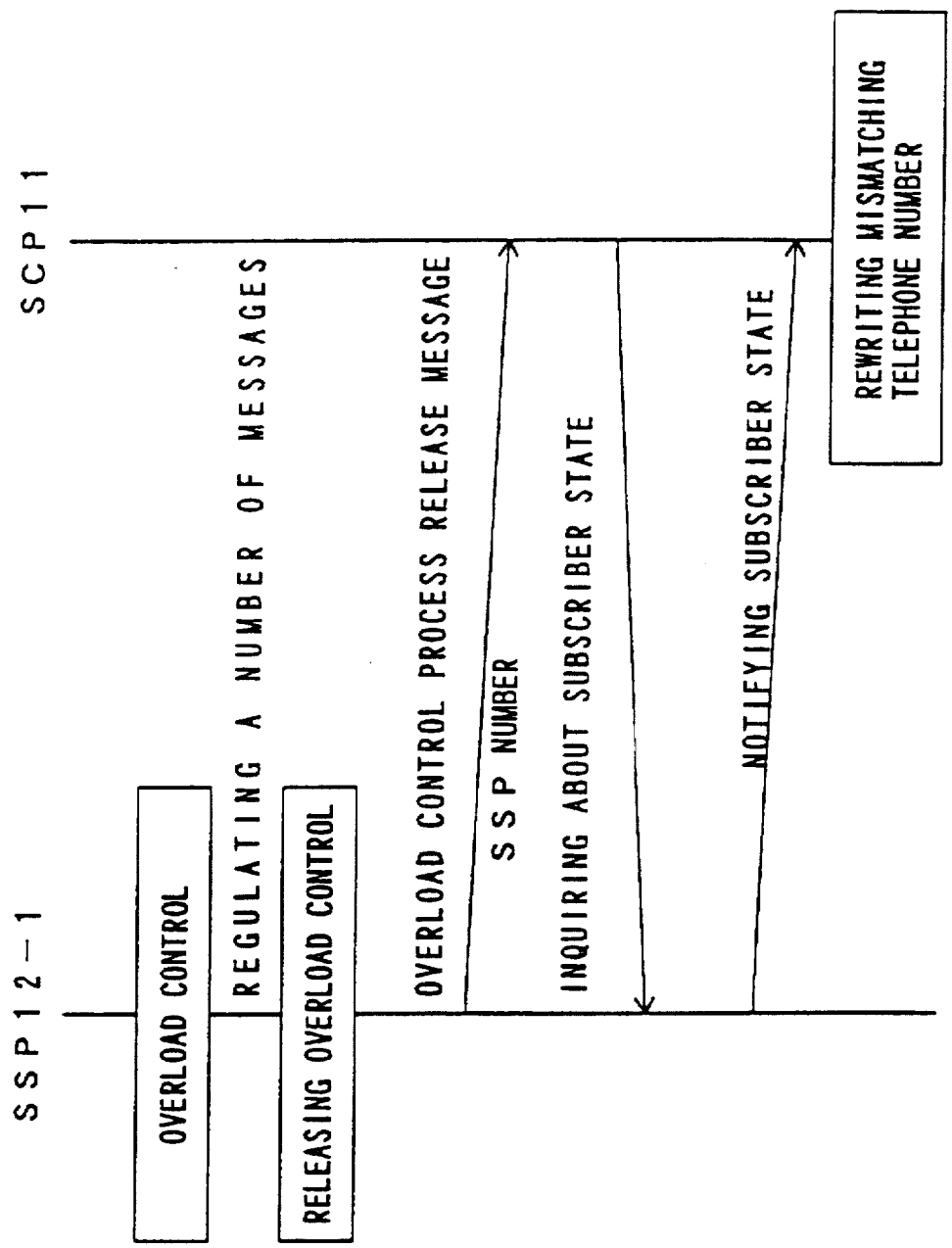
FIG. 15 is a flowchart 1 explaining a process for maintaining consistency between a communication state of the SCP and that of the SSP after an amount of messages (an amount of communication time) is regulated in one particular SSP.
Figure 16:
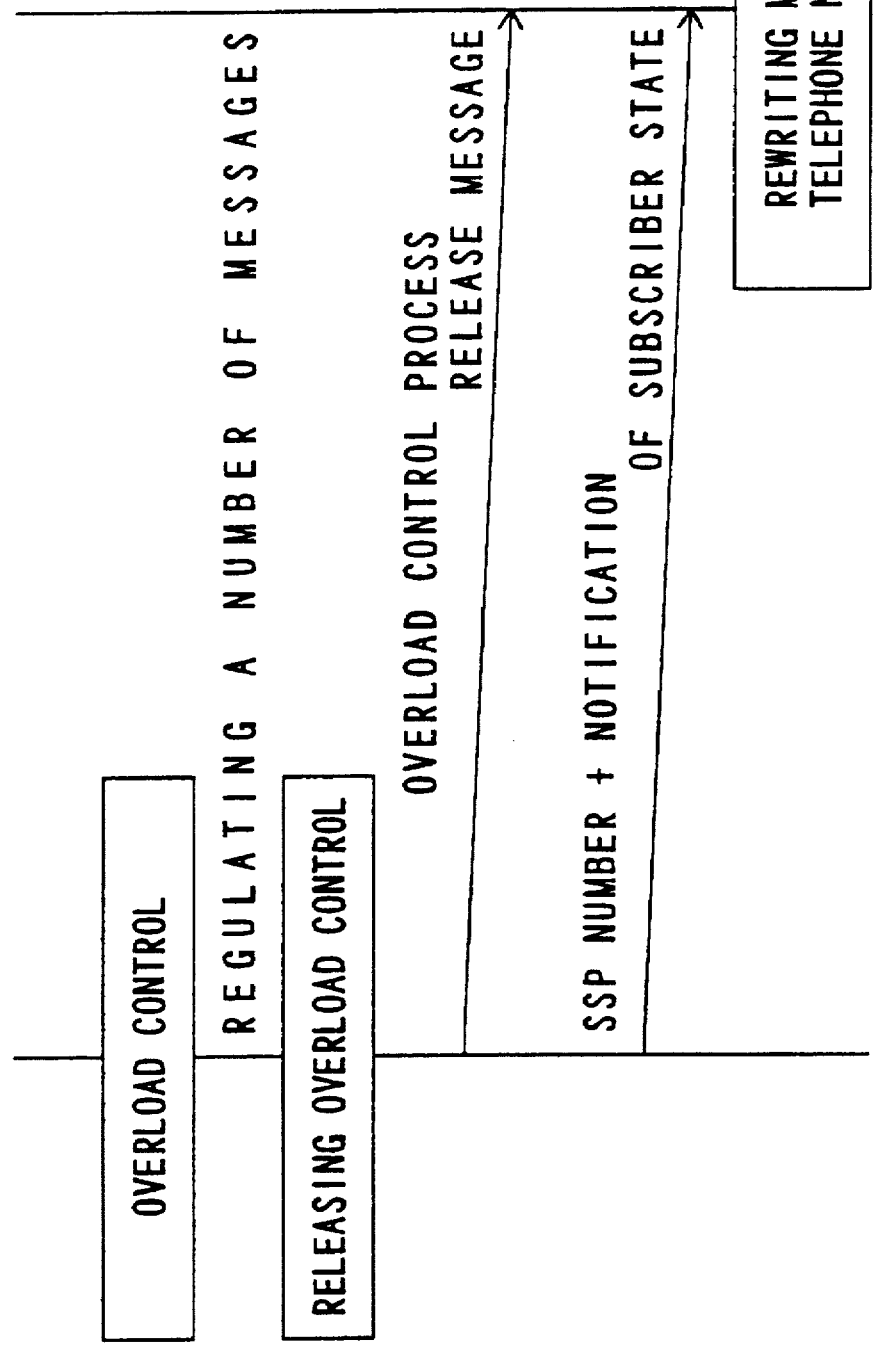
FIG. 16 is a flowchart 2 explaining a process for maintaining the consistency between a communication state of the SCP and that of the SSP after the amount of messages (the amount of communication time) is regulated in one particular SSP.

FIGS. 15 and 16 are flowcharts explaining processes for maintaining the consistency between a communication state of an SCP and that of an SSP, after an amount of messages (an amount of communication time) is regulated in a particular SSP.

Each of the SSPs 12-1 through 12-n starts an overload control process which imposes a restriction on accepting a message, when the amount of messages handled by each of the SSPs 12-1 through 12-n is close to an upper limit of its exchange capacity. Here, the SSP 12-1 is assumed to become into an overload state. When the overload state is released due to a decrease in the amount of messages, the SSP 12-1 transfers a message for releasing the overload control process and its SSP number (=101) identifying the SSP 12-1 to the SCP 11.

According to the procedure shown in FIG. 15, the SCP 11 searches for the management table 21 using the received number, retrieves only the information about the SSP 12-1, and inquires the SSP 12-1 whether or not the information is consistent with its actual communication state, when receiving the message for releasing an overload control process, in a similar manner as shown in FIG. 10. If there is information which does not match the communication state of the SSP 12-1, the SCP 11 updates the contents of the management table 21 in order to be consistent with the actual communication state of the SSP 12-1.

According to the procedure shown in FIG. 16, the inquiry about the subscriber state is made not from the SCP to the SSP, but the SSP which notifies the SCP which performs the overload control process of the communication state of subscribers. That is, the SSP 12-1 notifies the SCP 11 of the SSP number (=101) identifying the SSP 12-1 and the communication state of the subscriber accommodated in the SSP 12-1 in addition to the message for releasing the overload control process, likewise the procedure shown in FIG. 11. The SCP 11 then rewrites the management table 21 in order to be consistent with the communication state notified from the SSP 12-1.

Figure 17:
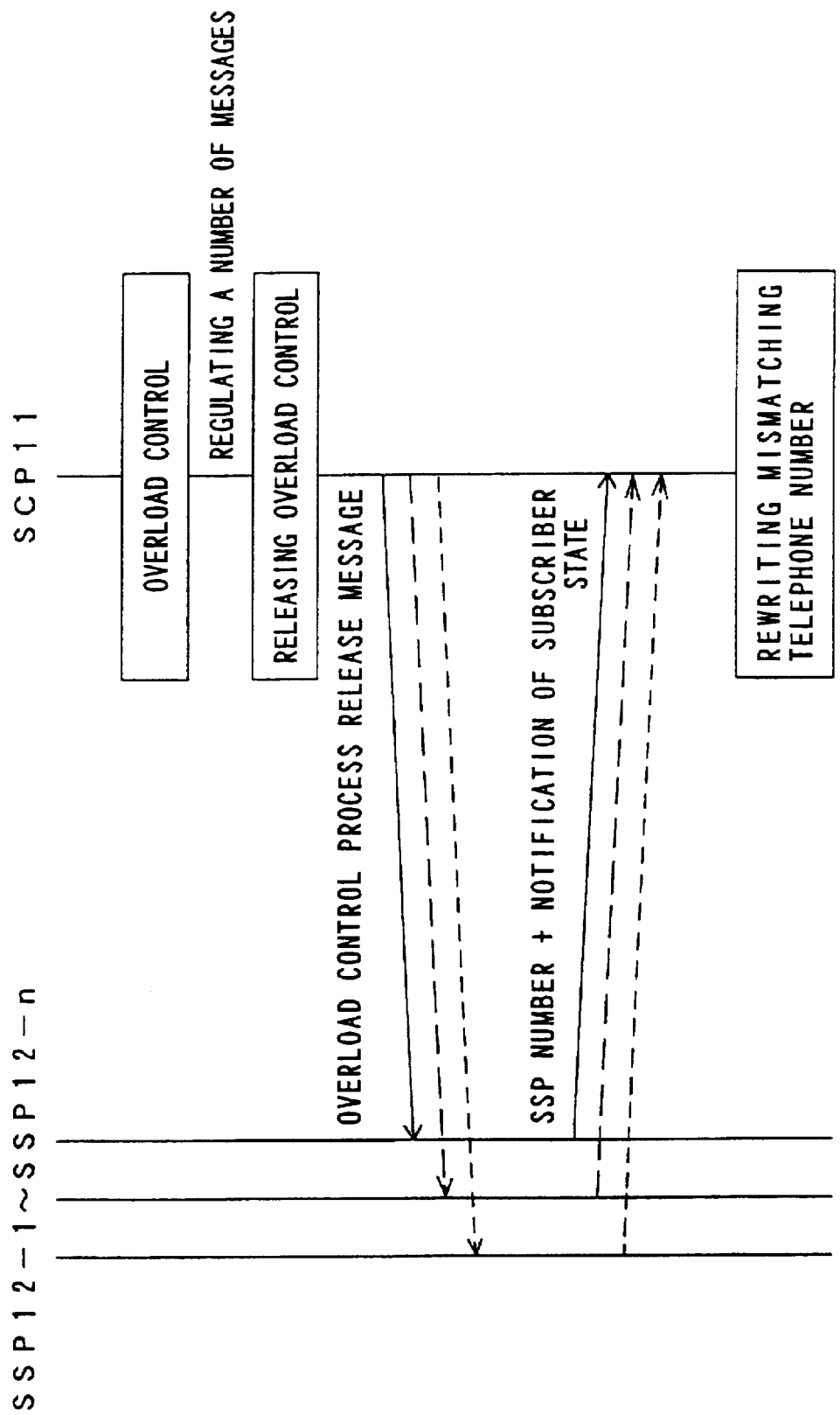
FIG. 17 is a flowchart showing a process for maintaining the consistency between a communication state of the SCP and that of the SSP after the amount of messages (the amount of communication time) is regulated in the SCP.

FIG. 17 is a flowchart explaining a process for maintaining the consistency between a communication state of an SCP and that of an SSP, after the amount of messages (the amount of communication time) is regulated in the SCP.

When the amount of messages handled by the SCP 11 increases and is close to a predetermined upper limit that can be processed, the SCP 11 starts an overload control process for imposing a restriction on accepting a message transferred from any of the SSPs 12-1 through 12-n. If the overload state is released due to a decrease in the amount of messages, the SCP 11 notifies each of the SSPs 12-1 through 12-n of a message for releasing an overload control process. Otherwise, the message for releasing the overload control process may be informed to only the SSP whose number is stored in the management table 21 in the SCP 11. Each of the SSPs that receives the message for releasing the overload control process notifies the SCP 11 of the communication state of its accommodating subscriber and SSP number. The SCP 11 updates the management table 21 in order to be consistent with the notified communication state.

Note that the consistency between the communication state of the SCP 11 and that of each of the SSPs 12-1 through 12-n may be maintained using a method wherein the SCP inquires an SSP whose number is stored in the management table 21 about its subscriber state, when the overload control process of the SCP 11 is released.

Figure 18:
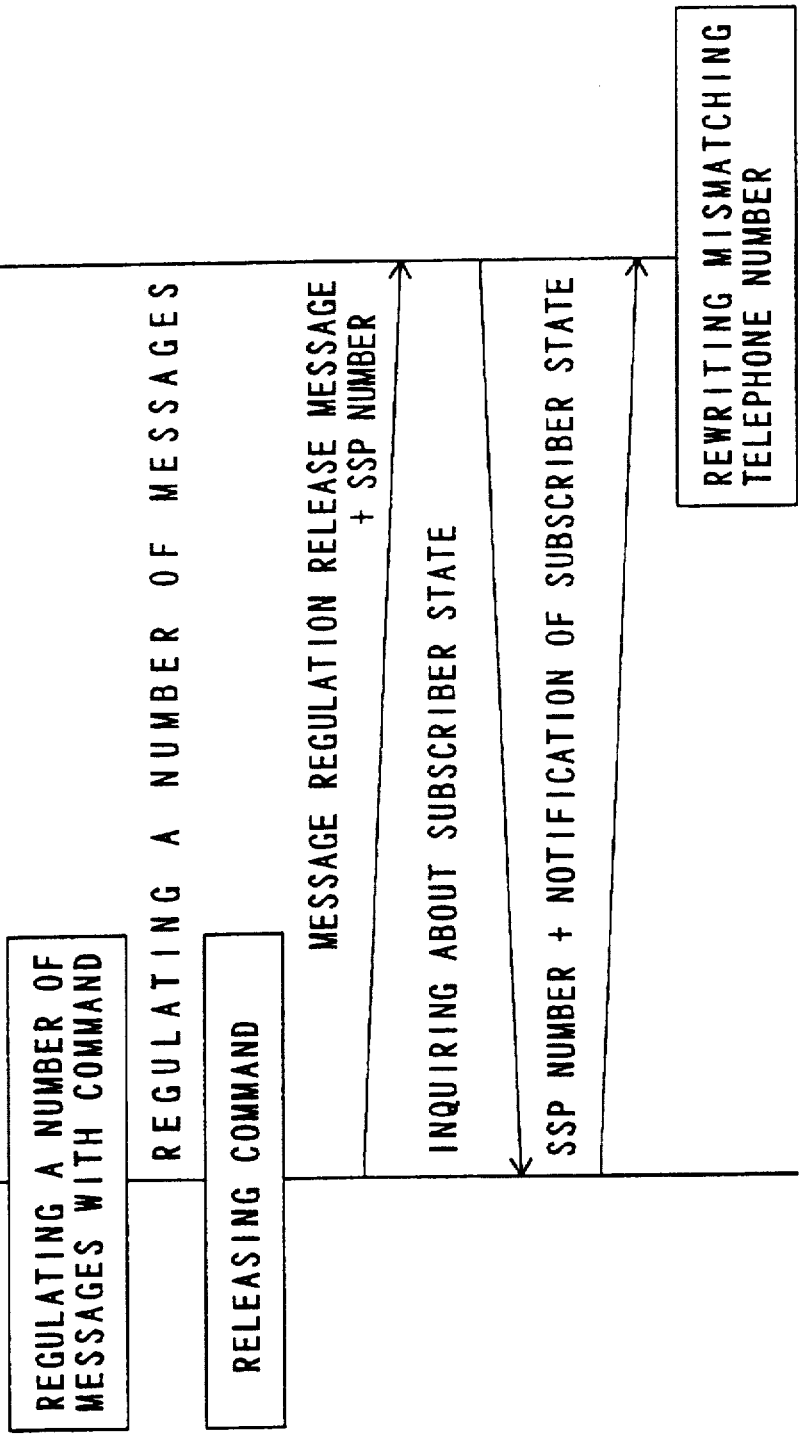
FIG. 18 is a flowchart 1 showing a process for maintaining the consistency between a communication state of the SCP and that of the SSP after a message transfer from the SSP to the SCP is regulated.
Figure 19:
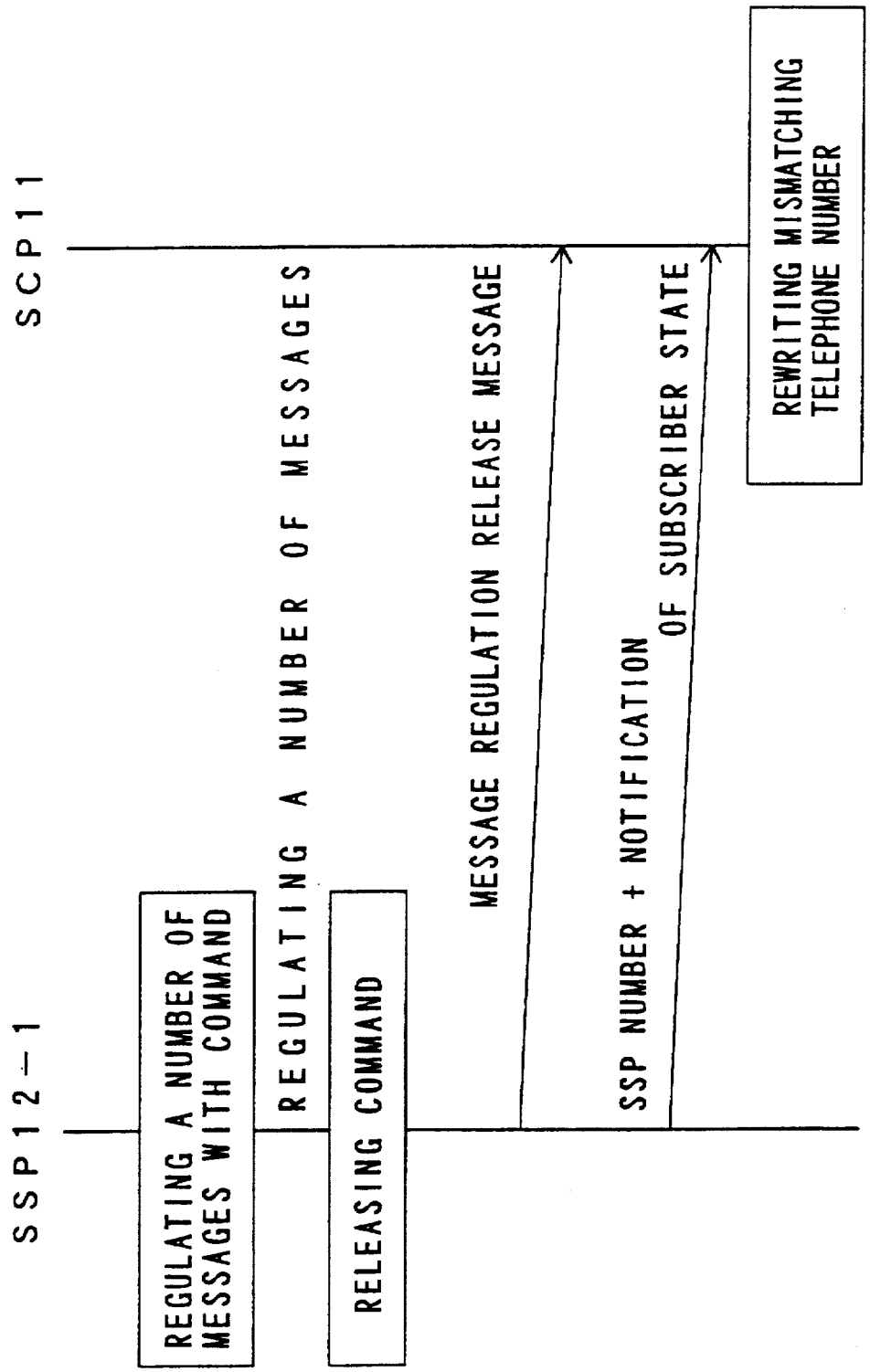
FIG. 19 is a flowchart 2 showing a process for maintaining the consistency between the communication state of the SCP and that of the SSP after the message transfer from the SSP to the SCP is regulated.

FIGS. 18 and 19 are flowcharts explaining the consistency between a communication state of an SCP and that of an SSP after a message transfer from the SSP to the SCP is regulated.

If the number of service requests made from the SSP to the SCP increases, there is a possibility that the SCP cannot provide all of the requested services. Accordingly, the amount of messages transferred from one particular SSP to the SCP can be regulated by entering a command from an operator (or an operating system) managing the entire network. However, since an SSP's message informing the SCP of, for example, a termination of a service provided by the SCP, is also regulated during such a regulation, there is a possibility that the actual communication state of the SSP does not match the communication state managed by the SCP. Therefore, the consistency between the SCP and the SSP must be verified if the above described regulation is released.

Once the regulation of the amount of messages made by the SSP 12-1 is released according to the procedure shown in FIG. 18, the SSP 12-1 notifies the SCP 11 that the regulation was released. When receiving the notification, the SCP 11 searches for the management table 21 to retrieve only the information about the SSP 12-1 using the received SSP number, and inquires whether or not that information is correct, in a similar manner as in the procedure shown in FIG. 10. If the information does not match the communication state of the SSP 12-1, the SCP 11 rewrites the contents of the management table 21 to be consistent with the actual communication state of the SSP 12-1.

According to the procedure shown in FIG. 19, the SSP 12-1 notifies the SCP 11 of its SSP number and the communication state of its accommodating subscriber, in a similar manner as in the procedure shown in FIG. 11. The SCP 11 then rewrites the management table 21 to be consistent with the communication state notified from the SSP 12-1.

The above described embodiment refers to an idle/busy state for each telephone number as the communication state managed by a management table arranged in the SCP. A "hook" state may be managed in addition to the idle/busy state. Furthermore, a transmission rate (transmission band) for each line or routing information for each subscriber, for example, may also be managed using management tables on the SCP and SSP sides.

The number conversion service is explained in the above described embodiment. However, the present invention is not limited to this service, and can be applied to other embodiments. The present invention can be applied to the configuration in which SSP numbers are managed in a management table arranged in an SCP, and the SCP controls and manages a network for each SSP using a corresponding SSP number. For example, the present invention can also be applied to a configuration in which the SCP collects desired statistical information for each SSP.

If the SCP becomes congested, it transfers, for example, a Call Gapping request to each SSP. A selective transfer of the Call Gapping request to, for example, only an SSP corresponding to an SSP number included in the management table at this time, can reduce the number of message transfers.

According to the present invention, when an SCP provides a service in response to a request made from an SSP, information identifying the SSP which outputs the request is stored in the SCP in correspondence with communication control information about the above described service. Therefore, the consistency between a communication state managed by the SCP and an actual communication state of the SSP can be maintained for each SSP.

Since the above described consistency process is implemented by only rewriting a management table arranged in an SCP, it can be performed in real time without affecting any other communications.

What is claimed is:

1. A communication state management system for managing a state of a communication using an intelligent network which provides a service to convert a predetermined number which is preregistered into a number identifying a terminal as a destination, comprising:

a plurality of service switching points (SSPs), each of said SSPs accommodating one or more terminals;

a service control point (SCP) for receiving a predetermined number which is preregistered and information identifying an SSP which outputs the predetermined number from at least one of said plurality of SSPs, storing a number identifying a terminal obtained from the received predetermined number, a communication state of the terminal, and the received information identifying the SSP in a communication state management table by making a correspondence between them, and controlling the communication state by using the communication state management table, wherein said SCP updates communication states for all of the terminals accommodated in the SSP of the communication state management table when trouble relating to one of said plurality of SSPs occurs.

2. The communication state management system according to claim 1, wherein:

the SCP makes communication states of said plurality of SSPs consistent with the communication states stored in the communication state management table by using the information identifying the SSP stored in the communication state management table.

3. The communication state management system according to claim 1, wherein:

whether the destination is either in a busy state or in an idle state is set as the communication state of the destination in the communication state management table.

4. The communication state management system according to claim 3, wherein:

when one of said plurality of SSPs is restored from a halt state, said SCP changes the communication state of the destination corresponding to information identifying the restored SSP to an idle state in the communication state management table.

5. The communication state management system for managing a state of a communication using an intelligent network which provides a service to convert a predetermined number which is preregistered into a number identifying a destination, comprising:

a plurality of service switching points (SSPs); and a service control point (SCP) for receiving a predetermined number which is preregistered and information identifying an SSP which outputs the predetermined number from at least one of said plurality of SSPs, storing a number identifying a destination obtained from the received predetermined number, a communication state of the destination, and the received information identifying the SSP in a communication state management table by making a correspondence between them, and controlling the communication state by using the communication state management table;

whether the destination is either in a busy state or in an idle state is set as the communication state of the destination in the communication state management table;

wherein said SCP retrieves a call which remains in the busy state for a predetermined amount of time or longer in the communication state management table, and changes the communication state of the destination corresponding to the retrieved call to the idle state in the communication state management table, if the retrieved call does not actually exist in said plurality of SSPs.

6. The communication state management system according to claim 1, wherein:

if a fault occurs in a link between one of said plurality of SSPs and said SCP, said SCP inquires the SSP connected via the link in which the fault occurs about its communication state, and makes the communication state management table consistent with the result of the inquiry.

7. The communication state management system according to claim 1, wherein:

if a fault occurs in a link between one of said plurality of SSPs and said SCP, the SSP connected via the link in which the fault occurs notifies said SCP of a communication state of a subscriber accommodated in the SSP, and said SCP makes the communication state management table consistent with the notification.

8. A communication state management system for managing a state of a communication using an intelligent network which provides a service to convert a predetermined number which is preregistered into a number identifying a destination, comprising:

a plurality of service switching points (SSPs); and a service control point (SCP) for receiving a predetermined number which is preregistered and information identifying an SSP which outputs the predetermined number from at least one of said plurality of SSPs, storing a number identifying a destination obtained from the received predetermined number, a communication state of the destination, and the received information identifying the SSP in a communication state management table by making a correspondence between them, and controlling the communication state by using the communication state management table;

wherein the intelligent network is configured so that said SCP and said plurality of SSPs are connected via a service transfer point STP; and when the STP is restored from a halt state, said SCP inquires an SSP among said plurality of SSPs about its communication state based on the information identifying an SSP stored in the communication state management table, and makes the communication state management table consistent with the result of the inquiry.

9. A communication state management system for managing a state of a communication using an intelligent network which provides a service to convert a predetermined number which is preregistered into a number identifying a destination, comprising:

a plurality of service switching points (SCP); and a service control point (SSPs) for receiving a predetermined number which is preregistered and information identifying an SSP which outputs the predetermined number from at least one of said plurality of SSPs, storing a number identifying a destination obtained from the received predetermined number, a communication state of the destination, and the received information identifying the SSP in a communication state management table by making a correspondence between them, and controlling the communication state by using the communication state management table;

wherein the intelligent network is configured so that said SCP and said plurality of SSPs are connected via a service transfer point STP; and when the STP is restored from a halt state, each of said plurality of SSPs notifies said SCP of a communication state of a subscriber accommodated in each of said plurality of SSPs, and said SCP makes the communication state management table consistent with the notification.

10. A communication state management system for managing a state of a communication using an intelligent network which provides a service to convert a predetermined number which is preregistered into a number identifying a destination, comprising:

a plurality of service switching points (SSPs); and a service control point (SCP) for receiving a predetermined number which is preregistered and information identifying an SSP which outputs the predetermined number from at least one of said plurality of SSPs, storing a number identifying a destination obtained from the received predetermined number, a communication state of the destination, and the received information identifying the SSP in a communication state management table by making a correspondence between them, and controlling the communication state by using the communication state management table;

wherein when said SCP is restored from a halt state, said SCP inquires an SSP among said plurality of SSPs about its communication state based on the information identifying an SSP stored in the communication state management table, and makes the communication state management table consistent with the result of the inquiry.

11. A communication state management system for managing a state of a communication using an intelligent network which provides a service to convert a predetermined number which is preregistered into a number identifying a destination, comprising:

a plurality of service switching points (SSPs); and a service control point (SCP) for receiving a predetermined number which is preregistered and information identifying an SSP which outputs the predetermined number from at least one of said plurality of SSPs, storing a number identifying a destination obtained from the received predetermined number, a communication state of the destination, and the received information identifying the SSP in a communication state management table by making a correspondence between them, and controlling the communication state by using the communication state management table;

wherein when one of said plurality of SSPs is released from an overload control state, said SCP accesses the communication state management table by using the information identifying the SSP released from the overload control state, and makes the communication state management table consistent with the communication state of the SSP released from the overload control state.

12. A communication state management system for managing a state of a communication using an intelligent network which provides a service to convert a predetermined number which is preregistered into a number identifying a destination, comprising:

a plurality of service switching points (SSPs); and a service control point (SCP) for receiving a predetermined number which is preregistered and information identifying an SSP which outputs the predetermined number from at least one of said plurality of SSPs, storing a number identifying a destination obtained from the received predetermined number, a communication state of the destination, and the received information identifying the SSP in a communication state management table by making a correspondence between them, and controlling the communication state by using the communication state management table;

wherein when said SCP is released from an overload control state, said SCP makes the communication state management table consistent with the communication state of each of said plurality of SSPs.

13. A communication state management system for managing a state of a communication using an intelligent network which provides a service to convert a predetermined number which is preregistered into a number identifying a destination, comprising:

a plurality of service switching points (SSPs); and a service control point (SCP) for receiving a predetermined number which is preregistered and information identifying an SSP which outputs the predetermined number from at least one of said plurality of SSPs, storing a number identifying a destination obtained from the received predetermined number, a communication state of the destination, and the received information identifying the SSP in a communication state management table by making a correspondence between them, and controlling the communication state by using the communication state management table;

wherein when one of said plurality of SSPs is released from a message transfer regulation state in which a message transfer to said SCP is regulated, said SCP accesses the communication state management table by using the information identifying the SSP released from the message transfer regulation state, and makes the communication state management table consistent with the communication state of the SSP released from the message transfer regulation state.

14. A communication state management system for managing a state of a communication using an intelligent network, comprising:

a plurality of service switching points (SSPs), each of said SSPs accommodating one or more terminals;

a service control point (SCP) for providing communication control information in response to a request made from one of said plurality of SSPs when a call is established, storing a communication state of a terminal of the call and information identifying the SSP which outputs the request by making a correspondence between them, and controlling a communication state of each of said plurality of SSPs using the stored information, for each of said plurality of SSPs, where said SCP updates communication states for all of the terminals accommodated in the SSP which outputs the request when trouble relating to one of said plurality of SSPs occurs.

15. A communication state management system for managing a state of a communication using an intelligent network, comprising:

a plurality of service switching points (SSPs), each of said SSPs accommodating one or more terminals; and a service control point (SCP) for providing a communication service in response to a request made from one of said plurality of SSPs, wherein:

each of said plurality of SSPs notifies said SCP of information identifying the SSP, when requesting said SCP to provide a service; and the SCP stores communication control information to be provided in response to a received request and received information identifying the SSP by making a correspondence between them, and manages a communication state of each of the plurality of SSPs using the stored information, wherein said SCP updates communication states for all of the terminals accommodated in the SSP when trouble relating to one of said plurality of SSPs occurs.

16. A service control point (SCP) for providing a service which converts a predetermined number which is preregistered into a number identifying a terminal as a destination, in response to a request made from a service switching points (SSP) in an intelligent network, comprising:

receiving means for receiving the predetermined number which is preregistered and information identifying an SSP which outputs the predetermined number from at least one of a plurality of SSPs, each of said SSPs accommodating one or more terminals;

storing means for storing the number identifying a destination obtained from the received predetermined number by the receiving means, a communication state of the destination and the received information identifying the SSP, by making a correspondence between them; and control means for making communication states of the plurality of SSPs consistent with the communication states stored in the storing means, by updating the storing means for each of said plurality of SSPs using the information identifying the SSP stored in the storing means, wherein communication states for all of the terminals are updated in the SSP when trouble relating to one of said plurality of SSPs occurs.

17. A communication state management method for managing a state of a communication using an intelligent network which provides a service to convert a predetermined number which is preregistered into a number identifying a terminal as a destination, comprising the steps of:

receiving the predetermined number which is preregistered and information for identifying a service switching point (SSP) which outputs the predetermined number from at least one of a plurality of SSPs, by a service control point (SCP), each of said SSPs accommodating one or more terminals;

storing the number identifying the terminal obtained from the received predetermined number, a communication state of the terminal, and the received information identifying the SSP, by making a correspondence between them; and making communication states of the plurality of SSPs consistent with the stored communication states by updating the communication states for each of said plurality of SSPs using the stored information identifying the SSP, wherein communication states for all of the terminals are updated in the SSP when trouble relating to one of said plurality of SSPs occurs.

* * * * *